(12) United States Patent
Schroeder

(10) Patent No.: US 6,509,961 B1
(45) Date of Patent: Jan. 21, 2003

(54) OPTICAL CROSS-SWITCH SIGNAL MONITORING METHOD AND SYSTEM THEREFOR

(75) Inventor: Dale Schroeder, Scotts Valley, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/894,169

(22) Filed: Jun. 27, 2001

(51) Int. Cl.[7] .............................................. G01N 21/00
(52) U.S. Cl. ...................................... 356/73.1; 385/17
(58) Field of Search ...................... 356/73.1; 385/20–24, 385/4, 15–19; 359/128; 351/205

(56) References Cited

U.S. PATENT DOCUMENTS

| | | | | |
|---|---|---|---|---|
| 5,581,643 A | * | 12/1996 | Wu | 385/17 |
| 5,699,462 A | * | 12/1997 | Fouquet et al. | 385/18 |
| 6,320,995 B1 | * | 11/2001 | Schroeder | 385/17 |
| 6,327,397 B1 | * | 12/2001 | Schiaffino et al. | 385/16 |
| 6,366,715 B1 | * | 4/2002 | Wang | 385/17 |

* cited by examiner

Primary Examiner—Frank G. Font
Assistant Examiner—Tu T. Nguyen

(57) ABSTRACT

A method and device are provided for monitoring a light signal in an optical switch having a first waveguide and a second waveguide that intersect a first trench such that optical coupling is dependent upon a fluid being at the first trench, and having a test waveguide that intersects a second trench such that optical coupling is dependent upon the fluid being at the second trench. By changing the fluid at the first trench to switch the optical switch to cause a light signal to be reflected from the first waveguide into the second waveguide and by partially changing the fluid at the second trench to switch the optical switch to cause a portion of the light signal to be reflected from the first waveguide into the test waveguide. The portion of the light signal in the test waveguide can be monitored using a light.

20 Claims, 2 Drawing Sheets

OPTICAL CROSS-SWITCH SIGNAL MONITORING METHOD AND SYSTEM THEREFOR

TECHNICAL FIELD

The invention relates generally to optical cross-switches and more particularly to a detector for monitoring signals in optical cross-switches.

BACKGROUND ART

In the past, telecommunications and data communications networks have traditionally relied on electrical signals transmitted electrically on conductive lines. As higher and higher data exchange rates are required, conductive lines are no longer sufficient and increasingly the data is transmitted through the use of optical signals through optical fibers. Equipment for efficiently generating and transmitting the optical signals has been designed and implemented, but the manufacturability of optical switches for use in telecommunications and data communications networks is problematic.

Fouquet et al. (U.S. Pat. No. 5,699,462), which is assigned to the assignee of the present invention, describes a switching matrix that is used for routing optical signals from any one of a number of parallel input optical fibers to any one of a number of parallel output optical fibers.

Referring now to FIG. 1 (PRIOR ART), therein is shown an isolated optical switching element 10 formed on a substrate 12. The substrate 12 is of silicon or silica. The optical switching element 10 includes planar waveguides defined by a lower cladding layer 14, a core 16, and an upper cladding layer 18. The core 16 is primarily silicon dioxide, but other materials that affect the index of refraction of the core may be used. The cladding layers 14 and 18 are formed of a material having a refractive index that is substantially different from the refractive index of the core material, so that optical signals are guided along the core material.

In the manufacturing process, the core 16 is patterned to define an input waveguide 20 and an output waveguide 26 of a first waveguide path and to define an input waveguide 24 and an output waveguide 22 of a second waveguide path. The upper cladding layer 18 is then deposited over the core 16. A trench 28 is etched through the core 16 at the intersection of the first and second waveguide paths and the two cladding layers 14 and 18 to the substrate 12. The waveguide paths intersect the trench 28 at an angle of incidence greater than the critical angle of total internal reflection (TIR) when the trench 28 is filled with a fluid, which can be a liquid, plasma, or a gas, having a refractive index which closely matches the refractive index of the waveguides; thus, light is transmitted to a "through" path to the output waveguide 26 when fluid is present in the trench 28.

Thus, TIR diverts light from the input waveguide 20 at a region 27 to a "reflected" path to the output waveguide 22, unless an index-matching fluid is located within the gap between the aligned waveguides 20 and 26. The trench 28 is positioned in a "forward" position with respect to the four waveguides 20, 26, 24, and 22 such that one sidewall of the trench 28 passes through or is slightly offset from the intersection of the axes of the waveguide paths on the side away from the input of the input waveguide 20.

Referring now to FIG. 2 (PRIOR ART), therein is shown a plurality of the optical switching elements 10 in a 4 times 4 matrix 32. In the 4 times 4 matrix 32, any one of four input waveguides 34, 36, 38 and 40 may be optically coupled to any one of four output waveguides 42, 44, 46, and 48. The switching arrangement is referred to as "non-blocking," since any free input waveguide can be connected to any free output waveguide regardless of which connections have already been made through the switching arrangement. Each of the sixteen optical switches has a trench that causes TIR in the absence of an index-matching fluid at the gap between collinear waveguides, but collinear waveguides of a particular waveguide path are optically coupled when the gaps between the collinear waveguides are filled with the refractive index-matching fluid. Trenches in which the waveguide gaps are filled with fluid are represented by fine lines that extend at an angle through the intersections of optical waveguides in the array. On the other hand, trenches in which the index-matching fluid is absent at the gaps are represented by broad lines through a point of intersection.

For example, the input waveguide 20 of FIGS. 1 and 2 (PRIOR ART) is in optical communication with the output waveguide 22 as a result of reflection at the empty gap of the trench 28. Since all other cross points for allowing the input waveguide 34 to communicate with the output waveguide 44 are in a transmissive state, a signal that is generated at the input waveguide 34 will be received at output waveguide 44. In like manner, the input waveguide 36 is optically coupled to the first output waveguide 42, the third input waveguide 38 is optically coupled to the fourth output waveguide 48, and the fourth input waveguide 40 is coupled to the third output waveguide 46.

There are a number of available techniques for changing an optical switch of the type shown in FIG. 1 from a transmissive state to a reflective state and back to the transmissive state. One method of changing states involves forming and eliminating the gap by forming and removing vapor bubbles in a refractive index-matching fluid. A plurality of heating elements are used where the application of heat to a trench forms the vapor bubble to remove the fluid and the removal of the heat causes the vapor bubble to collapse and return the fluid. The heating elements and their control are well known in the art and are used in ink jet printers.

The refractive index-matching fluid is supplied from a reservoir under the trench and resides within the trench in the waveguide paths until a vapor bubble is formed to create an index mismatch and cause light to be reflected at the sidewall of a trench. Collapsing the vapor bubble returns the switch to the transmissive state. A bubble forms in less than 1 ms when heat is applied and collapses in less than 1 ms when heat is removed.

In the optical switching element 10, light coming in is from an independent outside source and the light going out goes to an independent outside receiver, neither of which can be tapped for information. Unlike an electrical circuit where it is possible to make a parallel test connection, in optical circuits, parallel connections cause losses in the signal. Further, an external coupler is required for each waveguide and must be attached for each monitoring operation, which makes uninterrupted monitoring of the optical switching element 10 costly and time consuming.

Those skilled in the art have long sought, with little success, a way to be able to perform inexpensive uninterrupted monitoring of optical switches.

DISCLOSURE OF THE INVENTION

The present invention provides a method of monitoring a light signal in an optical switch having a first waveguide and a second waveguide that intersect a first trench such that optical coupling is dependent upon a fluid being at the first trench, and having a test waveguide that intersects a second trench such that optical coupling is dependent upon the fluid being at the second trench. By changing the fluid at the first trench to switch the optical switch to cause a light signal to be reflected from the first waveguide into the second waveguide and by partially changing the fluid at the second trench to switch the optical switch to cause a portion of the light signal to be reflected from the first waveguide into the test waveguide. The portion of the light signal in the test waveguide can be monitored using a light monitor for inexpensive uninterrupted monitoring of the optical switch.

The present invention further provides an optical switch for a light signal monitoring system. The system includes a support structure having a first waveguide and a second waveguide that intersect a first trench such that optical coupling is dependent upon a fluid being at the first trench, and a test waveguide that intersects a second trench such that optical coupling is dependent upon the fluid being at the second trench. A mechanism is provided for changing the fluid at the first trench to switch the optical switch to cause a light signal to be reflected from the first waveguide into the second waveguide and a mechanism for partially changing the fluid at the second trench to switch the optical switch to cause a portion of the light signal to be reflected from the first waveguide into the test waveguide which can be monitored using a light monitor for inexpensive uninterrupted monitoring of the optical switch.

The above and additional advantages of the present invention will become apparent to those skilled in the art from a reading of the following detailed description when taken in conjunction with the accompanying drawings.

BEST MODE FOR CARRYING OUT THE INVENTION

Figure 1:
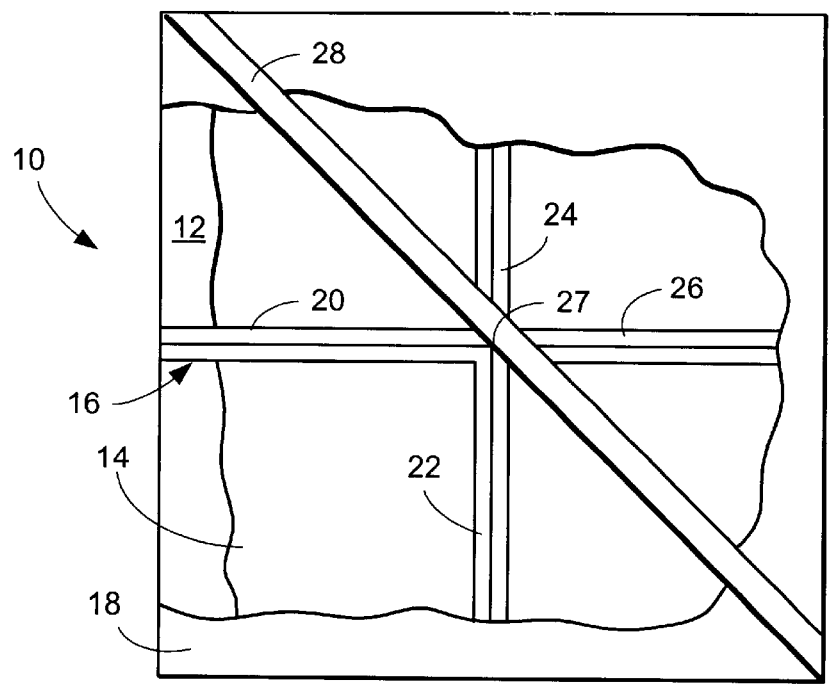
FIG. 1 (PRIOR ART) is a top view of an optical switching element that utilizes total internal reflection in accordance with the prior art.
Figure 2:
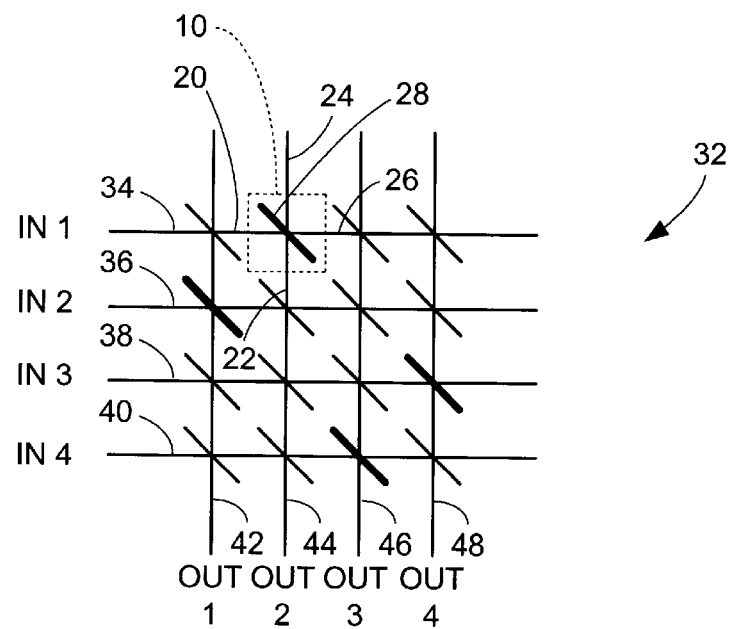
FIG. 2 (PRIOR ART) is a 4 times 4 matrix of switching elements of FIG. 1 to allow connection of any one of a number of input waveguides to any one of a number of output waveguides in accordance with the prior art.
Figure 3:
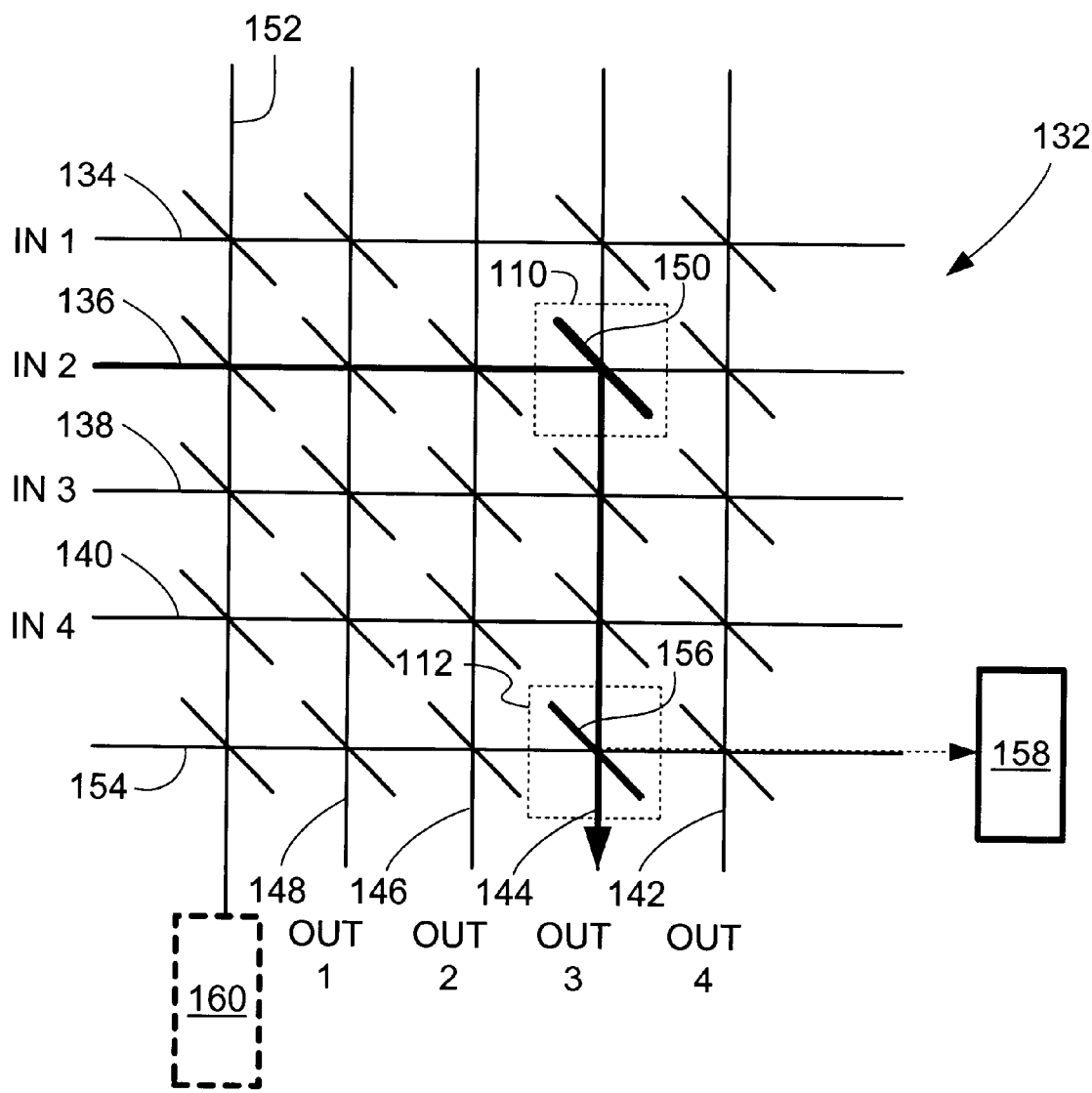
FIG. 3 is a 4 times 4 matrix of switching elements having a test column and test row waveguides, which allow monitoring an optical cross-connect switch in a system in accordance with the present invention.

Referring now to FIG. 3, therein are shown a plurality of optical switching elements 110, 112, and in a 4 times 4 matrix 132 on a support structure (not shown). In the 4 times 4 matrix 132, any one of four input waveguides 134, 136, 138 and 140 may be optically coupled to any one of four output waveguides 142, 144, 146, and 148. The switching arrangement is referred to as "non-blocking," since any free input waveguide can be connected to any free output waveguide regardless of which connections have already been made through the switching arrangement. Each of the sixteen optical switches has a trench that causes Total Internal Reflection (TIR) in the absence of an index-matching fluid at the gap between collinear waveguides, but collinear waveguides of a particular waveguide path are optically coupled when the gaps between the collinear waveguides are filled with the refractive index-matching fluid. The trenches in which the waveguide gaps are filled with fluid are represented by fine lines that extend at an angle through the intersections of optical waveguides in the array. On the other hand, broad lines through a point of intersection represent trenches in which the index-matching fluid is absent at the gaps.

For example, the input waveguide 136 is in optical communication with the output waveguide 144 as a result of reflection at the empty gap of a trench 150 in the optical switching element 110. Since all other cross points for allowing the input waveguide 136 to communicate with the output waveguide 144 are in a transmissive state, a signal that is generated for the input waveguide 136 will be output only at the output waveguide 144.

In the present invention, monitoring waveguides are present in the 4 times 4 matrix 132 in the form of a test column 152 and a test row 154 having associated trenches in the same manner as the other waveguides. The test column 152 can have all "forward" positioned trenches except for the trench at the intersection with the test row 154 or can have all "reversed" position trenches where the trenches pass through or are slightly offset from the intersection of the axes of the waveguide paths toward the input side of the input waveguides. The test row 154 has all "reversed" position trenches.

In developing the present invention, it was unexpectedly discovered that by using a heater resistor for heating the fluid in a trench caused a change in its index of refraction, which caused a partial mirroring effect. Further, it was observed that, when a bubble begins to form, it forms as a sphere and moves up into the trench as more vapor is formed as the fluid is brought to its boiling point by applying more power to the heater resistor. The bubble squeezes against the front edge of the trench and it has a rounded top on it. The rounded top first scatters light from the input waveguide into the output waveguide. As the bubble grows, it starts to flatten in the trench and to mirror the light. As the bubble grows fully, a full mirror effect is established and the light from the input waveguide is fully reflected into the output waveguide.

Using the test column 152 and the test row 154, it has been found to be possible to monitor any signal input by heating the fluid in a trench using the same resistor used to form the switching bubble but by applying a much lower power. When the fluid is heated, its index of refraction changes causing some of the signal to take a "switched" path while the majority of the signal continues on the through path. Similarly, the heating can also be controlled to produce a partial bubble, which also causes some of the signal to take the switched path. The ability to control the heating to change the refractive index and control the formation of the bubble allows control of the degree of the TIR mirror effect. As a result, the signal may be "tapped" without a significant signal loss.

A light receiver can monitor the tapped signal or monitor the through path signal by being connected to either the output of the test column 152 or of the test row 154.

For example, in unmonitored operation, the light signal is transmitted along the input waveguide 136 where a bubble in the trench 150 causes reflection into the output waveguide 144. To monitor the light signal in the input waveguide 136 and the output waveguide 144, a bubble is formed at low power in a trench of a switching element such as a trench 156 of the optical switching element 112 to direct a tapped signal (shown as a dotted line) to a monitor 158.

As would be evident, monitoring could also be performed of any input waveguide by forming a bubble at low power an appropriately positioned trench in the test column 152 to provide the tapped signal to an alternate monitor 160. Also, more than one trench in the column 152 could be turned on at low power to monitor any activity into the 4 times 4 matrix 132 without requiring scanning. Similarly, monitoring could also be performed of any output waveguide using an appropriately positioned trench in the test row 154 to provide the tapped signal to the monitor 158.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the spirit and scope of the included claims. All matters hitherto-fore set forth or shown in the accompanying drawings are to be interpreted in an illustrative and non-limiting sense.

The invention claimed is:

1. A method of monitoring a light signal in a fluid containing device comprising:
   providing a fluid containing device having a plurality of optical waveguides and a plurality of trenches provided in the fluid containing device, including:
      a first waveguide and a second waveguide that intersect a first trench such that optical coupling between the first and second waveguides is dependent upon a fluid being at the first trench, and
      a test waveguide that intersects a second trench such that optical coupling between the test and first waveguides is dependent upon the fluid being at the second trench;
   changing the fluid at the first trench to switch the fluid containing device to cause a light signal to be reflected between the first and second waveguides;
   partially changing the fluid at the second trench to switch the fluid containing device to cause a portion of the light signal to be reflected between the test and first waveguides; and
   monitoring the portion of the light signal in the test waveguide using a light monitor.

2. The method as claimed in claim 1 wherein the fluid containing device includes a second test waveguide that intersects a third trench such that optical coupling between the test waveguides is dependent upon the fluid being at the third trench including:
   changing the fluid at the third trench to switch the fluid containing device to cause the portion of the light signal to be reflected from the test waveguide into the second test waveguide; and wherein:
   monitoring the portion of the light signal in the test waveguide is performed through the second test waveguide.

3. The method as claimed in claim 1 wherein the fluid containing device includes a third waveguide that intersects a third trench such that optical coupling between the first and third waveguides is dependent upon the fluid being at the third trench and a second test waveguide intersects a fourth trench such that optical coupling between the second test and third waveguides is dependent upon the fluid being at the fourth trench including:
   partially changing the fluid at the third trench to switch the fluid containing device to cause the light signal to be reflected between the first and third waveguides;
   changing the fluid at the fourth trench to switch the fluid containing device to cause a portion of the light signal to be reflected between the second test and third waveguides; and wherein:
   monitoring the portion of the light signal in the third waveguide is performed through the second test waveguide.

4. The method as claimed in claim 1 wherein partially changing the fluid at the second trench changes the index of refraction of the second trench.

5. The method as claimed in claim 1 wherein partially changing the fluid at the second trench causes the beginning of bubble formation at the second trench.

6. A method of monitoring a light signal in a fluid containing device comprising:
   providing a fluid containing device having a plurality of optical waveguides and a plurality of trenches provided in the fluid containing device, including:
      a first waveguide and a second waveguide that intersect a forward positioned first trench such that optical coupling between the first and second waveguides is dependent upon a refractive index-matching fluid being at the first trench, and
      a test waveguide that intersects a reverse positioned second trench such that optical coupling between the first and test waveguides is dependent upon the refractive index-matching fluid being at the second trench;
   heating the refractive index-matching fluid at a first power level at the first trench to switch the refractive index-matching fluid containing device to cause a light signal to be reflected between the first and second waveguides;
   heating the refractive index-matching fluid at a second power level lower than the first power level at the second trench to switch the fluid containing device to cause a portion of the light signal to be reflected between the test and first waveguides; and
   monitoring the portion of the light signal in the test waveguide using a light monitor.

7. The method as claimed in claim 6 wherein the fluid containing device includes a second test waveguide that intersects a reverse positioned third trench such that optical coupling between the test waveguides is dependent upon the refractive index-matching fluid being at the third trench including:
   heating the refractive index-matching fluid at the second power level at the third trench to switch the fluid containing device to cause the portion of the light signal to be reflected between the second test and test waveguides; and wherein:
   monitoring the portion of the light signal in the test waveguide is performed through the second test waveguide.

8. The method as claimed in claim 6 wherein the refractive index-matching fluid containing device includes a third waveguide that intersects a forward positioned third trench such that optical coupling between the first and third waveguides is dependent upon the refractive index-matching fluid being at the third trench and a second test waveguide intersects a reverse positioned fourth trench such that optical coupling between the third and second test waveguides is dependent upon the refractive index-matching fluid being at the fourth trench including:
   heating the refractive index-matching fluid at the first power level at the third trench to switch the fluid containing device to cause the light signal to be reflected between the first and third waveguides;
   heating the refractive index-matching fluid at the second power level at the fourth trench to switch the fluid containing device to cause a portion of the light signal to be reflected between the second test and third waveguides; and wherein:

monitoring the portion of the light signal in the third waveguide is performed through the second test waveguide.

9. The method as claimed in claim 6 wherein heating the refractive index-matching fluid at the second power level at the second trench changes the index of refraction of the second trench.

10. The method as claimed in claim 6 wherein heating the refractive index-matching fluid at the second power level at the second trench causes the beginning of bubble formation at the second trench.

11. A fluid containing device for a light signal monitoring system, comprising:

a support structure;

a plurality of optical waveguides and a plurality of trenches provided in the support structure, including:
 a first waveguide and a second waveguide that intersect a first trench such that optical coupling between the first and second waveguides is dependent upon a fluid being at the first trench, and
 a test waveguide that intersects a second trench such that optical coupling between the first and test waveguides is dependent upon the fluid being at the second trench;

a mechanism for changing the fluid at the first trench to switch the fluid containing device to cause a light signal to be reflected between the first and second waveguides; and a mechanism for partially changing the fluid at the second trench to switch the fluid containing device to cause a portion of the light signal to be reflected between the test and first waveguides.

12. The fluid containing device as claimed in claim 11 including a second test waveguide that intersects a third trench such that optical coupling between the test waveguides is dependent upon the fluid being at the third trench including:
 a mechanism for partially changing the fluid at the third trench to switch the fluid containing device to cause the portion of the light signal to be reflected between the test and second waveguides.

13. The fluid containing device as claimed in claim 11 including a third waveguide that intersects a third trench such that optical coupling between the first and third waveguides is dependent upon the fluid being at the third trench and a second test waveguide intersects a fourth trench such that optical coupling between the third and second test waveguides is dependent upon the fluid being at the four trench including:
 a mechanism for partially changing the fluid at the third trench to switch the fluid containing device to cause the light signal to be reflected between the first and third waveguides; and
 a mechanism changing the fluid at the fourth trench to switch the fluid containing device to cause a portion of the light signal to be reflected between the second test and third waveguides.

14. The fluid containing device as claimed in claim 11 wherein the mechanism for partially changing the fluid at the second trench changes the index of refraction thereof.

15. The fluid containing device as claimed in claim 11 wherein the mechanism for partially changing the fluid at the second trench causes the beginning of bubble formation at the second trench.

16. A system for monitoring light signals in a fluid containing device comprising:

a fluid containing device having a plurality of optical waveguides and a plurality of trenches provided in the fluid containing device, including:
 a first waveguide and a second waveguide that intersect a forward positioned first trench such that optical coupling between the first and second waveguides is dependent upon a refractive index-matching fluid being at the first trench, and
 a test waveguide that intersects a reverse positioned second trench such that optical coupling between the first and test waveguides is dependent upon the refractive index-matching fluid being at the second trench;

a heater for heating the refractive index-matching fluid at a first power level at the first trench to switch the refractive index-matching fluid containing device to cause a light signal to be reflected between the first and second waveguides;

a heater for heating the refractive index-matching fluid at a second power level lower than the first power level at the second trench to switch the fluid containing device to cause a portion of the light signal to be reflected between the test and first waveguides; and a light monitor for monitoring the portion of the light signal in the test waveguide.

17. The system as claimed in claim 16 wherein the fluid containing device includes a second test waveguide that intersects a reverse positioned third trench such that optical coupling between the test waveguides is dependent upon the refractive index-matching fluid being at the third trench including:
 a heater for heating the refractive index-matching fluid at the second power level at the third trench to switch the fluid containing device to cause the portion of the light signal to be reflected between the second test and test waveguides; and wherein:

the light monitor monitors the portion of the light signal in the test waveguide through the second test waveguide.

18. The system as claimed in claim 16 wherein the refractive index-matching fluid containing device includes a third waveguide that intersects a forward positioned third trench such that optical coupling between the first and third waveguides is dependent upon the refractive index-matching fluid being at the third trench and a second test waveguide intersects a reverse positioned fourth trench such that optical coupling between the third and second test waveguides is dependent upon the refractive index-matching fluid being at the fourth trench including:
 a heater for heating the refractive index-matching fluid at the first power level at the third trench to switch the fluid containing device to cause the light signal to be reflected between the first and third waveguides;
 a heater for heating the refractive index-matching fluid at the second power level at the fourth trench to switch the fluid containing device to cause a portion of the light signal to be reflected between the second test and third waveguides; and wherein:

the light monitor monitors the portion of the light signal in the third waveguide through the second test waveguide.

19. The system as claimed in claim 16 wherein the heater for heating the refractive index-matching fluid at the second power level at the second trench changes the index of refraction of the second trench.

20. The system as claimed in claim 16 wherein the heater for heating the refractive index-matching fluid at the second power level at the second trench causes the beginning of bubble formation at the second trench.

* * * * *